United States Patent [19]
Muehlbauer et al.

[11] Patent Number: 5,455,320
[45] Date of Patent: Oct. 3, 1995

[54] METHOD OF MAKING POLYMERIC PARTICLES

[75] Inventors: John L. Muehlbauer; Dennis E. Smith; Thomas H. Whitesides, all of Rochester, N.Y.

[73] Assignee: Eastman Kodak Company, Rochester, N.Y.

[21] Appl. No.: 221,544

[22] Filed: Mar. 31, 1994

Related U.S. Application Data

[63] Continuation-in-part of Ser. No. 152,753, Nov. 15, 1993, abandoned.

[51] Int. Cl.$^6$ .................. C08F 2/20; C08F 2/18
[52] U.S. Cl. .......... 526/207; 526/89; 526/200; 526/910
[58] Field of Search .............. 526/207, 89, 200, 526/910

[56] References Cited

U.S. PATENT DOCUMENTS

| | | | |
|---|---|---|---|
| 2,875,186 | 2/1959 | Gerhard, II | 526/199 |
| 2,875,187 | 2/1959 | Gerhard, II | 526/199 |
| 3,053,820 | 9/1962 | Wechsler | 526/207 |
| 3,357,158 | 12/1967 | Hollis | 521/38 |
| 3,549,562 | 12/1970 | Mindick | 526/207 |
| 4,022,622 | 5/1977 | Timmerman et al. . | |
| 4,052,343 | 10/1977 | Cunningham | 521/38 |
| 4,246,385 | 1/1981 | Weintraub | 526/207 |
| 4,256,840 | 3/1981 | Meitzner | 521/33 |
| 4,382,124 | 5/1983 | Meitzner | 521/38 |
| 4,614,708 | 9/1986 | Timmerman et al. . | |
| 5,057,407 | 10/1991 | Okamura et al. . | |

FOREIGN PATENT DOCUMENTS

| | | |
|---|---|---|
| 75-231 | 3/1983 | European Pat. Off. . |
| 62-136643 | 6/1987 | Japan . |
| 62-136639 | 6/1987 | Japan . |
| 62-231956 | 10/1987 | Japan . |
| 63-008736 | 1/1988 | Japan . |
| 2013940 | 1/1990 | Japan . |
| 455742 | 10/1936 | United Kingdom . |

OTHER PUBLICATIONS

"Sensitivities of Droplet Size and Stability in Monomeric Emulsions", K. Fontenot & F. J. Schork, *Ind. Eng. Chem. Res.*, 1993, pp. 373–385.

"Microemulsions and Miniemulsions", S. Ross & I. Morrison, *Colloidal Systems and Interfaces*, John Wiley & Sons, 1988 pp. 290–293.

*Primary Examiner*—Fred Zitomer
*Attorney, Agent, or Firm*—Robert A. Gerlach

[57] ABSTRACT

A method of making polymeric particles by forming a suspension of ethylenically unsaturated monomer droplets in water, the water containing a particulate suspension agent, the monomer droplets containing a nonreactive hydrophobic compound where the water solubility of the nonreactive compound is less than that of the monomer and polymerizing the monomer droplets.

13 Claims, No Drawings

METHOD OF MAKING POLYMERIC PARTICLES

This is a Continuation-In-Part of application Ser. No. 152,753, filed Nov. 15, 1993, now abandoned.

BACKGROUND OF THE INVENTION

Field of the Invention

This invention relates to a method for making particles. More particularly, it relates to a method of making uniformly-sized polymeric particles, with a very low population of oversized particles.

It is known that particles can be made by a variety of in situ polymerization techniques such as suspension polymerization or limited coalescence (LC) polymerization as well as crushing or grinding of solid polymer samples, spray drying, evaporation of solvent from a dispersion of a polymer solution, etc. In order to obtain a narrow particle size distribution of useful product, all of these techniques require extensive sorting and classification operations that are costly, time-consuming and cause substantial reductions in yield. LC polymerization frequently provides nearly monodisperse particle size distributions. However, even with LC polymerization, the particle size distribution of polymer particles is not ideal. In particular, it is commonly observed that a substantial population of oversized particles is formed. Further, particularly when larger particles are being made, an appreciable amount of coagulum results. The presence of these materials introduces the necessity for complex processing steps in manufacturing such as, filtration, sieving, cyclone separation and the like.

LC polymerization is a term referring to a specific kind of suspension polymerization process. "Suspension polymerization" refers to a process in which a polymerizable liquid is dispersed as droplets in a continuous aqueous medium and polymerized under continuous agitation.

Normally, this process is carried out in the presence of a "granulating agent", such as a lyophilic polymer (starch, natural gums, polyvinyl alcohol or the like) or an insoluble fine powder such as calcium phosphate. These granulating agents help to obtain a dispersion of droplets of the polymerizable liquid but do not provide sufficient stabilization of the dispersion so that the dispersed droplets are stable in the absence of agitation. Therefore, in this method, it is necessary to carry out the polymerization under continuous mechanical agitation, since otherwise extensive coalescence of the droplets will occur, with separation of a bulk phase of the water immiscible, polymerizable material. Because this process depends on the details of the shear field in the reactor, and on the changing viscosity of the polymerizing dispersed phase, it is difficult to control reproducibly, is not readily scalable, and gives broad particle size distribution (PSD). In addition, conditions for one dispersed phase are not generalizable to other dispersed phases.

"Limited coalescence polymerization", also refers to a process in which the water-immiscible polymerizable liquid is dispersed in an aqueous medium. In distinction to the suspension polymerization method, however, the dispersion process is carried out in the presence of a colloidal water-insoluble particulate stabilizer which is capable of providing good stability to the dispersed droplets. In the presence of such a stabilizer, the droplets are stable once formed, even in the absence of mechanical agitation. The polymerization can therefore be carried out with no or minimal stirring (only enough to prevent creaming or sedimentation and provide good thermal transfer). Various stabilizing colloids are well-known in the art (for example, clays, colloidal silica, and latex particles, as described, for example, in U.S. Pat. Nos. 5,133,912; 4,965,131 and 2,932,629). This process has also been referred to as "quiescent suspension polymerization". It has substantial advantages over normal suspension polymerization, in that it gives reproducible behavior, relatively narrow PSD which are a function principally of the amount of particulate colloidal stabilizer used (and not a function of the mechanical agitation), is readily scalable, and allows high productivity because large concentrations of polymerizable materials can be suspended in the aqueous medium.

The size and PSD of the particles obtained by LC polymerization depends on the stability of the monomer droplets to particle growth during the polymerization process. While the particulate stabilizers useful in LC provide excellent protection against growth by a coalescence mechanism, growth by a diffusional mechanism is still possible, particularly for monomers which have appreciable water solubility.

Thus, it can be readily seen that there is a need for a process of preparing polymeric particles that are uniformly sized and have reduced populations of oversized particles.

SUMMARY OF THE INVENTION

The invention provides a method of making polymeric particles by forming a suspension of ethylenically unsaturated monomer droplets in water, the water containing a particulate suspension agent, the monomer droplets containing a nonreactive compound having a solubility in water less than that of the ethylenically unsaturated monomer and polymerizing the monomer droplets.

This method is particularly suitable for making polymeric particles where uniform size and size distribution are a consideration such as photographic matte beads, electrophotographic toner particles, thermal print spacer beads, polymeric micro-voiding agents, grinding media, spreading layers, particle size standards, filter challenge media, ion-exchange resin packing media, Merrifield synthesis supports, etc.

The invention is also advantageous in that it provides a limited coalescence method that allows for increases in the practical concentrations of polymerizable materials resulting in increased productivity. Further, it permits the production of smaller size polymeric particles than that generally obtained using limited coalescence. Also, it permits the preparation of polymeric particles by limited coalescence utilizing more hydrophilic monomers. Finally, it allows for the elimination of free radical scavengers such as, potassium dichromate from the water phase.

DETAILED DESCRIPTION OF THE INVENTION

In limited coalescence polymerization, generally, an ethylenically unsaturated monomer or mixture of monomers together with a free radical initiator are agitated under high shear with an aqueous medium containing a colloidal water-insoluble particulate suspension stabilizer, a promoter and a free radical scavenger. When equilibrium is reached, i.e., the size stabilized by limited coalescence, the suspension is heated to cause the polymerization of the monomer droplets.

In accordance with the invention, the nonreactive compound will have a solubility in water less than that of the ethylenically unsaturated monomer. Where more than one ethylenically unsaturated monomer is employed, as in the preparation of a copolymer, the nonreactive compound will have a solubility in water less than that of the least soluble monomer. Stated another way, the nonreactive compound is more hydrophobic than the most hydrophobic ethylenically unsaturated monomer in the monomer droplets. A convenient manner of defining the hydrophobicity of materials is by calculating the log of the octanol/water partition coefficient ($logP_{(calc)}$), the higher the numerical value, the more hydrophobic is the compound. Thus, the nonreactive compound will have a $logP_{(calc)}$ greater than the $logP_{(calc)}$ of the most hydrophobic ethylenically unsaturated monomer present. Preferably, the difference in $logP_{(calc)}$ of the monomer and the nonreactive compound ($\Delta logP_{(calc)}$) should be at least 1 and most preferably at least 3 to achieve the most uniform particle size with the lowest values for particle size distribution.

In accordance with the invention, the nonreactive hydrophobic compound is present in the ethylenically unsaturated monomer droplets (discontinuous phase); however, the hydrophobic compound can be added initially either to the monomer phase before addition of the water or continuous phase, which is preferred, or to the water phase either before or after the two phases are added together but before agitation. While not being bound by a particular theory or mechanism, it is believed that oversized particles are formed by diffusion of monomers prior to or during polymerization and that the hydrophobic additive prevents or reduces the rate of diffusion, and thereby reduces the formation of larger particles.

Any suitable ethylenically unsaturated monomer or mixture of monomers may be used in the practice of this invention, such as, vinyl substituted aromatic compounds, such as styrene, vinyl toluene, p-chlorostyrene, or vinyl naphthalene; ethylenically unsaturated mono-olefins, such as ethylene, propylene, butylene, or isobutylene; vinyl halides, such as vinyl chloride, vinyl bromide, vinyl fluoride; vinyl esters, such as, vinyl acetate, vinyl propionate, vinyl benzoate, or vinyl butyrate; esters of α-methylene monocarboxylic acids, such as methyl acrylate, ethyl acrylate, n-butyl acrylate, n-octyl acrylate, 2-chloroethyl acrylate, phenyl acrylate, methyl-α-chloroacrylate, methyl methacrylate, ethyl methacrylate, butyl methacrylate; acrylonitrile, methacrylonitrile, acrylamide, isopropylacrylamide, dimethylacrylamide; vinyl ethers, such as vinyl methyl ether, vinyl isobutyl ether, and vinyl ethyl ether; vinyl ketones, such as vinyl methyl ketone, vinyl hexyl ketone, and methyl isopropenyl ketone; acrolein; vinylidene halides, such as vinylidene chloride and vinylidene chlorofluoride; and N-vinyl compounds such as N-vinylpyrrolidone, N-vinyl pyrrole, N-vinyl carbazole, and N-vinyl indole; mixtures thereof and the like.

If desired, a suitable crosslinking monomer may be used in forming polymer droplets by polymerizing a monomer or monomers within droplets in accordance with this invention to thereby modify the polymeric particle and produce particularly desired properties. Typical crosslinking monomers are aromatic divinyl compounds such as divinylbenzene, divinylnaphthalene or derivatives thereof; diethylene carboxylate esters and amides such as diethylene glycol bis-(methacrylate), diethylene glycol diacrylate, and other divinyl compounds such as divinyl sulfide or divinyl sulfone compounds.

The invention also permits the use of more hydrophilic ethylenically unsaturated monomers not previously applicable to limited coalescence polymerization techniques because of the need for adequate immiscibility, such as, for example, methyl acrylate.

As indicated above, the nonreactive compound is more hydrophobic than that of the monomer and has a higher $logP_{(calc)}$ than the monomer. $logP_{(calc)}$ is the logarithm of the value of the octanol/water partition coefficient (P) of the compound calculated using MedChem, version 3.54, a software package available from the Medicinal Chemistry Project, Pomona College, Claremont, Calif. $logP_{(calc)}$ is a parameter which is highly correlated with measured water solubility for compounds spanning a wide range of hydrophobicity. $logP_{(calc)}$ is a useful means to characterize the hydrophobicity of compounds. The nonreactive compounds used in this invention are either liquid or oil soluble solids and have a $logP_{(calc)}$ greater than any of the ethylenically saturated monomers present. Suitable nonreactive, hydrophobic compounds are those selected from the following classes of compounds:

I. Saturated and unsaturated hydrocarbons and halogenated hydrocarbons, including alkanes, alkenes, alkyl and alkenyl halides, alkyl and alkenyl aromatic compounds, and halogenated alkyl and alkenyl aromatic compounds, especially those having a $logP_{calc}$ greater than about 3, II. alcohols, ethers, and carboxylic acids containing a total of about 10 or more carbon atoms, especially those having a $logP_{calc}$ greater than about 3, III. esters of saturated, unsaturated, or aromatic carboxylic acids containing a total of about 10 or more carbon atoms, especially those having a $logP_{calc}$ greater than about 3, IV. amides of carboxylic acids having a total of 10 or more carbon atoms, especially those having a $logP_{calc}$ greater than about 3, V. esters and amides of phosphorus- and sulfur-containing acids having a $logP_{calc}$ greater than about 3, and other compounds of similar hydrophobicity.

Compounds of Class I include: straight or branched chain alkanes such as, for example, hexane, octane, decane, dodecane, tetradecane, hexadecane, octadecane, 2,2,6,6,9,9-hexamethyldodecane, eicosane, or triacontane; alkenes such as, for example, heptene, octene, or octadecene; substituted aromatic compounds such as, for example, octylbenzene, nonylbenzene, dodecylbenzene, or 1,1,3,3-tetramethylbutylbenzene; haloalkanes such as, for example, heptyl chloride, octyl chloride, 1,1,1-trichlorohexane, hexyl bromide, 1,11-dibromoundecane, and halogenated alkyl aromatic compounds such as, for example, p-chlorohexylbenzene and the like.

Compounds of Class II include: decanol, undecanol, dodecanol, hexadecanol, stearyl alcohol, oleyl alcohol, eicosanol, di-t-amyl phenol, p-dodecylphenol, and the like; lauric acid, tetradecanoic acid, stearic acid, oleic acid, and the like; methyldodecylether, dihexyl ether, phenoxytoluene, and phenyldodecyl ether; and the like.

Compounds of Class III include: methyl laurate, butyl laurate, methyl oleate, butyl oleate, methyl stearate, isopropyl palmitate, isopropyl stearate, tributyl citrate, acetyl tributyl citrate, 3-( 4-hydroxy-3,5-di-t-butylphenyl)propionic octadecyl ester (commercially available under the trademark Irganox 1076), 2-ethylhexyl-p-hydroxylbenzoate, phenethyl benzoate, dibutyl phthalate, dioctyl phthalate, dioctyl terephthalate, bis(2-ethylhexyl) phthalate, butyl benzyl phthalate, diphenyl phthalate, dibutyl sebacate, didecyl succinate, and bis(2-ethylhexyl) azelate and the like.

Compounds of Class IV include: lauramide, N-methyllauramide, N,N-dimethyllauramide, N,N-dibutyllauramide, N-decyl-N-methylacetamide, and N-oleylphthalimide and the like.

Compounds of Class V include, for example, sulfates, sulfonates, sulfonamides, sulfoxides, phosphates, phosphonates, phosphinates, phosphites, or phosphine oxides. Particular examples include diesters of sulfuric acid, such as, for example, dihexylsulfate, didecylsulfate, and didodecylsulfate; esters of various alkyl sulfonic acids including, for example, methyl decanesulfonate, octyl dodecanesulfonate, and octyl p-toluenesulfonate; sulfoxides, including, for example, bis(2-ethylhexyl)sulfoxide; and sulfonamides, including, for example, N-(2-ethylhexyl)-p-toluenesulfonamide, N-hexadecyl-p-toluenesulfonamide, and N-methyl-N-dodecyl-p-toluenesulfonamide. Phosphorus-containing compounds include, for example, triesters of phosphoric acid such as, for example, triphenyl phosphate, tritolylphosphate, trihexylphosphate, and tris(2-ethylhexyl)phosphate; various phosphonic acid esters, such as, for example, dihexyl hexylphosphonate, and dihexyl phenylphosphonate; phosphite esters such as tritolylphosphite, and phosphine oxides such as trioctylphosphine oxide.

Representatives compounds are given below, along with their $logP_{calc}$ value, calculated using the above-mentioned MedChem software package (version 3.54). This software package is well-known and accepted in the chemical and pharmaceutical industries.

|  | $logP_{calc}$ |
|---|---|
| Nonreactive Compound | |
| hexane | 3.87 |
| octane | 4.93 |
| decane | 5.98 |
| dodecane | 7.04 |
| hexadecane | 9.16 |
| dimethylphthalate | 1.36 |
| dibutylphthalate | 4.69 |
| bis(2-ethylhexyl)phthalate | 8.66 |
| dioctylphthalate | 8.92 |
| tritolylphosphate | 6.58 |
| tris(2-ethylhexyl)phosphate | 9.49 |
| dodecylbenzene | 8.61 |
| bis(2-ethylhexyl)azelate | 9.20 |
| trioctylphosphine oxide | 9.74 |
| dinonyl phthalate | 9.98 |
| didecyl phthalate | 11.04 |
| didodecyl phthalate | 13.15 |
| 3-(4-hydroxy-3, 5-di-t-butylphenyl)-propionic acid. octadecyl ester | 14.07 |
| trioctyl amine | 10.76 |
| Monomer | |
| acrylic acid | 0.16 |
| isopropyl acrylamide | 0.20 |
| b-(hydroxyethyl) methacrylate | 0.25 |
| vinyl acetate | 0.59 |
| methyl acrylate | 0.75 |
| methyl methacrylate | 1.06 |
| ethyl acrylate | 1.28 |
| ethyl methacrylate | 1.59 |
| butyl acrylate | 2.33 |
| butyl methacrylate | 2.64 |
| styrene | 2.89 |
| mixture of vinyl toluenes | 3.37 |
| 2-ethylhexyl acrylate | 4.32 |
| 2-ethylhexyl methacrylate | 4.62 |
| t-butylstyrene | 4.70 |

The hydrophobic compound is employed in an amount of from about 0.01 to about 5, preferably from about 0.05 to about 4 and most preferably from about 0.5 to about 3 percent by weight based on the weight of the monomer.

Any catalyst or initiator which is soluble in the particular monomer or monomers polymerized within the droplets may be utilized in the process of the invention. Typical initiators for polymerization are the peroxide and azo initiators. Among those found suitable for use in the process of the invention are 2,2' azobis (2,4-dimethyl valeronitrile), lauroyl peroxide, benzoyl peroxide and the like which result in complete polymerization without leaving detrimental residual materials. Chain transfer agents may also be added to the monomer to control the properties of the polymer particles formed.

The diameter of the polymer droplets, and hence the diameter of the polymer particles (average particle size), can be varied predictably in limited coalescence methods. This is accomplished by deliberate variation of the composition of the aqueous liquid dispersion to control the average particle size of the polymer particles, in particular the amount of particulate suspension stabilizer.

The particulate suspension stabilizers employed in the practice of this invention include any of the solid colloidal materials that are known in prior art to be suitable for this purpose. Such stabilizers provide a third phase because they are insoluble in both the aqueous suspension medium and in the suspended droplets. They are also nondispersible in the droplets, but wettable or can be made to be wettable by the droplets. They are more hydrophilic than oleophilic, and more hydrophilic than the droplets, so that they can remain at the interface of the aqueous suspension medium and the suspended droplets. Such stabilizers can be inorganic materials such as insoluble metal salts or hydroxides or oxides or clays or can be organic materials such as starches, sulfonated crosslinked organic homopolymers and resinous polymers, as described, for example, in U.S. Pat. No. 2,932,629. Silica, as described in U.S. Pat. No. 4,833,060, and copolymers such as copoly(styrene-2-hydroxyethyl methacrylate-methyacrylic acid-ethylene glycol dimethacrylate), as described in U.S. Pat. No. 4,965,131, are examples of particularly desirable particulate suspension stabilizers that can be used in the practice of this invention.

It is known that some suspension stabilizers, for example silica, are used with promoters that are present in the aqueous suspension medium and drive the particulate suspension stabilizer to the interface between the aqueous layer and the polymer droplets formed. When a promoter is used in the method of this invention, any suitable promoter that affects the hydrophilic/hydrophobic balance of the particulate suspension stabilizer in the aqueous suspension medium may be employed to drive the solid particulate suspension stabilizer particles to the interface. Suitable materials include, for example, sulfonated polystyrenes, alginates, carboxymethyl cellulose, various alkyl or polyalkyl ammonium salts, polydiethylaminoethylmethacrylate, water-soluble complex resinous amine condensation products such as water-soluble condensation products of ethylene oxide, urea and formaldehyde, polyethyleneimine and the water soluble condensation products of diethanol amine and adipic acid. A particularly suitable promoter of this type is poly(adipic acid-co-methylaminoethanol). Also effective as promoters are gelatin, glue, casein, albumin and gluten. Nonionic materials such as methoxy cellulose can be used. Generally, the promoter is used in amounts of at least 0.2, often about 1 to 1.2 parts per 100 parts of aqueous solution.

It is sometimes desirable to add to the aqueous suspension a few parts per million of a water-soluble, oil-insoluble polymerization inhibitor, also referred to as a free radical scavenger which is effective to prevent the polymerization of monomer molecules that may diffuse into the aqueous suspension medium. Suitable inhibitors are well-known in the prior art as exemplified by U.S. Pat. Nos. 2,932,629 and 4,994,312. Suitable polymerization inhibitors include, for example, potassium dichromate and cupric sulfate pentahydrate. As previously indicated herein, the use of these inhibitors is optional in the process of this invention due to the presence of the hydrophobic compound.

The invention is further illustrated by the following examples in which parts and percentages are by weight unless otherwise noted and particle size distributions and populations of oversize particles are measured using a Coulter Multisizer TAII.

EXAMPLE 1 (INVENTION)

23.5 g of Perkadox AMBN (Akzo Chemical) initiator is dissolved in 2348 g of vinyltoluene, together with a small amount of hexadecane, the amount expressed as wt.% based on monomer, as shown in Table I. In a separate container, 3.32 kg of pH 4 buffer (prepared from 200 kg distilled water, 2092 g potassium biphthalate, and 820 ml 0.1N HCl) is mixed with 0.3 g potassium dichromate, 40.25 g MAEA (poly(N-methylaminoethanol-co-adipate)) and 575 grams of colloidal silica sold by DuPont Co. under the trade designation Ludox TM. The monomer solution is combined with the aqueous solution, stirred for 10 minutes, the mixture passed through a Crepaco homogenizer operated at 5000 psi and then heated to 70° C. with slow stirring overnight. This procedure is designed to yield particles with a mean size (volume weighted distribution) of 1.9 μm. Oversized particles are defined to be those larger than 5 μm.

EXAMPLE 2 (CONTROL)

Vinyl toluene is polymerized under conditions identical to Example 1, except that no hexadecane is included in the monomer.

EXAMPLES 3–10

The procedure of Example 1 is repeated with the exception of the changes noted in Table I.

TABLE I

Properties of Particles Prepared According to Examples 1–10

| Example | Nonreactive Compound | Wt. % | $M_v$ (μm) | Oversize (PPM) |
|---|---|---|---|---|
| 1 (invention) | HD[a] | 2 | 1.90 | 50 |
| 2 (control) | none | — | 1.85 | 1635 |
| 3 (invention) | HD[a] | 1 | 1.69 | 68 |
| 4 (invention) | HD[a] | 0.5 | 1.95 | 90 |
| 5 (invention) | HD[a] | 0.3 | 1.80 | 472 |
| 6 (invention) | HD[a] | 0.15 | 1.65 | 685 |
| 7 (invention) | HD[a] | 0.075 | 1.65 | 1123 |
| 8 (invention) | HC[b] | 0.5 | 1.81 | 178 |
| 9 (invention) | DD[c] | 1.0 | 1.74 | 52 |
| 10 (invention) | OC[d] | 1.0 | 1.70 | 388 |

[a]HD = hexadecane
[b]HC = hexacosane
[c]DD = dodecane.
[d]OC = octane

EXAMPLES 11–20

Several polymerizations are carried out under conditions similar to Examples 1 and 2, except that other ethylenically unsaturated monomers are substituted for vinyl toluene. This procedure is designed to yield particles with a mean size (volume weighted distribution) of 1 to about 2 μm. Oversized particles are defined to be those larger than 5 μm.

Results are reported in Table II.

TABLE II

Properties of Particles Prepared According to Examples 11–20

| Example | Nonreactive Compound | Wt % | $M_v$ (μm) | Oversize (PPM) | Monomer or Mixture |
|---|---|---|---|---|---|
| 11 (control) | none | — | 1.72 | 286 | VtDy[b] |
| 12 (invention) | HD[a] | 1 | 1.80 | 25 | VtDy[b] |
| 13 (control) | none | — | 6.0 | 104,000 | Mm[c] |
| 14 (invention) | HD | 1 | 1.21 | 113 | Mm[c] |
| 15 (control) | none | — | 4.7 | 59,800 | MmEd[d] |
| 16 (invention) | HD | 1 | 1.23 | 247 | MmEd[d] |
| 17 (control) | none | — | 1.93 | 995 | VtMn[e] |
| 18 (invention) | HD | 1 | 1.92 | 103 | VtMn[e] |
| 19 (control) | none | — | (set up in flask) | | Ma[f] |
| 20 (invention) | HD | 1 | 1.33 | 74 | Ma[f] |

[a]HD = hexadecane.
[b]VtDy = 70/30 (by weight) vinyl toluene/divinylbenzene.
[c]Mm = methyl methacrylate
[d]MmEd = 90/10 (by weight) methyl methacrylate/ethylene bis(methacrylate).
[e]VtMn = 90/10 (by weight) vinyl toluene/2-hydroxyethyl methacrylate.
[f]Ma = methyl acrylate.

EXAMPLE 21

In two separate runs, 16.8 g of VAZO 52, a free radical initiator sold by DuPont Co. is dissolved in 1595 g styrene and 84 g divinyl benzene, together with 0 and 1% hexadecane respectively. In a separate container, 0.56 g potassium dichromate and 3.85 g MAEA are dissolved in 1975 g distilled water, and mixed with 35.65 g Ludox TM. The monomer solution and aqueous solution are combined, stirred vigorously for 10 minutes, and passed through a Crepaco Homogenizer. The resulting suspension is polymerized at 50° C. under mild stirring overnight, and then heated to 80° C. for 4 hours. This procedure is designed to yield particles with a mean size (volume weighted distribution) of 18.5 μm. Oversized particles are defined to be those larger than 25 μm. With no hexadecane in the monomer mixture, the mean size is 18.9 μm, and there are 1740 ppm oversized particles (control). With 1% hexadecane, the mean size is 18.0 μm and there are only 1000 ppm oversized particles (invention).

EXAMPLE 22

In two separate runs, 12.6 g of VAZO 52 is dissolved in 873 g styrene and 374.4 g divinyl benzene, together with 0 and 1 percent of hexadecane respectively. In a separate container, 0.942 g potassium dichromate and 11.74 g poly-(diethanolamine-co-adipate) are dissolved in 1782 g distilled water, and mixed with 175.5 g Ludox TM. The monomer solution and aqueous solution are combined, stirred vigorously for 10 minutes, and passed through a Crepaco Homogenizer. The resulting suspension is polymerized at 50° C. under mild stirring overnight, and then heated to 80° C. for 4 hours. This procedure is designed to yield particles with a mean size (volume weighted distribution) of 3.5 μm. Oversized particles are defined to be those larger than 8 μm. In the absence of hexadecane (control), the mean size is 3.36 μm and there are 201 ppm oversized particles, while with 1% hexadecane, the mean size is 3.70 μm and only 20 ppm oversized particles are found.

EXAMPLE 23 (INVENTION)

14.0 g of Perkadox AMBN (Akzo Chemical) is dissolved in 1400 g of vinyltoluene, together with 1% based on weight of monomer of hexadecane. In a separate container, 3.32 kg of pH4 buffer (prepared from 200 kg distilled water, 2092 g potassium biphthalate, and 820 ml 0.1N HCL) is mixed with 0.3 g potassium dichromate, 40.25 g MAEA(poly(N-methylaminoethanol-co-adipate)) and 575 g Ludox TM. The monomer solution is combined with the aqueous solution, and stirred for 10 minutes. The mixture is then passed through a Crepaco homogenizer, and heated to 70° C. with slow stirring overnight. Oversized particles were defined to be those larger than 5 μm.

EXAMPLE 24

This preparation is identical to Example 23, except that the hexadecane is omitted.

EXAMPLE 24 (INVENTION)

This preparation is identical to Example 23, except that potassium dichromate is omitted from the aqueous phase.

The results of Examples 23–25 are summarized in Table III.

TABLE III

| Example # | Hexadecane | Dichromate | $M_v(\mu m)$a | PPM > 5 μm |
|---|---|---|---|---|
| 23 | yes | yes | 0.98 | 468 |
| 24 | no | yes | 2.15 | 5074 |
| 25 | yes | no | 1.04 | 100 | a Measured using a Microtrac FRA particle size analyzer.

Comparison of Examples 23 and 24 shows that in the presence of hexadecane, smaller particles, 1 μm in size, are prepared. In addition, substantially fewer oversized particles are formed in Example 23.

Comparison of Example 23 and 25 shows that the good results of the invention are obtained even in the absence of dichromate in the aqueous phase, with even fewer oversized particles and a similar mean size being formed in the preparation in which the dichromate is omitted.

The invention has been described in detail with particular reference to preferred embodiments thereof, but it will be understood that variations and modifications can be effected within the spirit and scope of the invention.

What is claimed is

1. A method of making polymeric particles which comprises forming droplets of ethylenically unsaturated monomer and from about 0.01 to about 5 percent by weight based on the weight of the monomer of a nonreactive compound in an aqueous medium, the nonreactive compound having a solubility in water less than that of the ethylenically unsaturated monomer, the aqueous medium containing a particulate suspension stabilizing agent to limit coalescence of the ethylenically unsaturated monomer droplets and polymerizing the ethylenically unsaturated monomer.

2. The method of claim 1 wherein at least two ethylenically unsaturated monomers are present in the droplets and the nonreactive compound has a solubility in water less than that of the ethylenically unsaturated monomer having the least solubility in water.

3. The method of claim 1 wherein the nonreactive compound has a $logP_{calc}$ greater than the $logP_{calc}$ of the ethylenically unsaturated monomer where $logP_{calc}$ is the logarithm of the value of the octanol/water partition coefficient.

4. The method of claim 3 wherein the difference of $logP_{calc}$ of the nonreactive compound and the monomer is at least 1.

5. The method of claim 3 wherein the difference of $logP_{calc}$ of the nonreactive compound and the monomer is at least 3.

6. The method of claim 1 wherein the monomer and nonreactive compound are mixed together and then mixed with the aqueous medium.

7. The method of claim 1 wherein the monomer droplets contain a free radical initiator.

8. The method of claim 1 wherein the aqueous medium contains a promoter.

9. The method of claim 1 wherein the nonreactive compound is hexadecane.

10. The method of claim 1 wherein the nonreactive compound is used in an amount of from about 0.05 to about 4 percent based on the weight of the monomer.

11. The method of claim 10 wherein the amount of the nonreactive compound is from about 0.05 to about 3 percent.

12. The method of claim 10 wherein the amount of the nonreactive compound is at least about 0.5 percent.

13. A method of making polymeric particles which comprises combining a nonreactive compound having a $logP_{(calc)}$ of at least 3, an ethylenically unsaturated monomer having a $logP_{(calc)}$ less than that of the nonreactive compound and an initiator to form a first mixture, the nonreactive compound being present in an amount of from about 0.01 to about 5 percent by weight based on the weight of the monomer, combining water, a particulate suspension stabilizing agent and a promoter to form a second mixture, combining the first and second mixtures under high shear to form a discontinuous phase of droplets of the first mixture in a continuous phase of the second mixture whereby the size of the droplets is determined by limited coalescence and causing the polymerization of the ethylenically unsaturated monomer.

* * * * *